United States Patent
Barrs, II et al.

(10) Patent No.: US 9,936,833 B2
(45) Date of Patent: Apr. 10, 2018

(54) INTELLIGENT MAILBOX

(71) Applicant: International Business Machines Corporation, Armonk, NY (US)

(72) Inventors: John W. Barrs, II, Boca Raton, FL (US); Arun K. Ramamurthy, Delray Beach, FL (US); Massimo Terpolilli, Cary, NC (US); Loan Vo, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 15/074,485

(22) Filed: Mar. 18, 2016

(65) Prior Publication Data

US 2017/0265667 A1 Sep. 21, 2017

(51) Int. Cl.
| | |
|---|---|
| *H04N 7/18* | (2006.01) |
| *A47G 29/12* | (2006.01) |
| *H04W 52/02* | (2009.01) |
| *H04B 1/40* | (2015.01) |
| *A47G 29/122* | (2006.01) |

(52) U.S. Cl.
CPC ....... *A47G 29/1209* (2013.01); *A47G 29/122* (2013.01); *H04B 1/40* (2013.01); *H04W 52/0229* (2013.01); *H04W 52/0254* (2013.01)

(58) Field of Classification Search
CPC .......... H04W 52/0229; H04W 52/0254; Y02B 60/50; A47G 29/1209; A47G 29/122; H04B 1/40
See application file for complete search history.

(56) References Cited

U.S. PATENT DOCUMENTS

| | | | |
|---|---|---|---|
| 2008/0104179 A1* | 5/2008 | Agrawal | G06Q 10/107 709/206 |
| 2015/0016665 A1 | 1/2015 | Tanner | |
| 2015/0359372 A1 | 12/2015 | Cho et al. | |

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

* cited by examiner

*Primary Examiner* — Sathyanaraya V Perungavoor
*Assistant Examiner* — Peet Dhillon
(74) *Attorney, Agent, or Firm* — Sherman IP LLP; Kenneth L. Sherman; Steven Laut (57) ABSTRACT

A mail receptacle platform is configured to receive and to stack mail, and rotate to collect new mail. The mail receptacle includes a retained mail compartment, a discarded mail compartment, a video camera configured to capture video within a general mail receptacle compartment, an extendible arm including a mail grabber, the extendible arm is connected to an actuator configured to be actuated based on control signals, to place a particular piece of mail for viewing by the video camera, and to sort mail retained by the mail receptacle platform into one of the retained mail compartment and the discarded mail compartment, and a control interface configured to receive control signals and transmit video captured by the video camera. The control interface includes: a receiver, a transmitter and a power source.

1 Claim, 5 Drawing Sheets

INTELLIGENT MAILBOX

BACKGROUND

Traditional mailboxes require users to be physically present at home to pick-up their mail, sort it and discard what is unwanted.

SUMMARY

Embodiments of the invention relate to intelligent mailboxes. One embodiment includes a mail receptacle platform that is configured to receive and to stack mail, and rotate to collect new mail. The mail receptacle includes a retained mail compartment, a discarded mail compartment, a video camera configured to capture video within a general mail receptacle compartment, an extendible arm including a mail grabber, the extendible arm is connected to an actuator configured to be actuated based on control signals, to place a particular piece of mail for viewing by the video camera, and to sort mail retained by the mail receptacle platform into one of the retained mail compartment and the discarded mail compartment, and a control interface configured to receive control signals and transmit video captured by the video camera. The control interface comprising: a receiver configured to receive wireless control signals for controlling movement and extension of the extendible arm, the grabber and the mail receptacle platform; a transmitter configured to transmit video signals captured from the video camera; and a power source configured to be turned on and off based on at least one of a received power control signal and sensed motion within the mail receptacle platform, wherein the power source is configured to supply power to the actuator and the video camera.

These and other features, aspects and advantages of the present invention will become understood with reference to the following description, appended claims and accompanying figures.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

One or more embodiments provide an intelligent mailbox that uses a camera to allow a remote user to browse mail dropped in the mailbox. A mechanical arm grabs or picks-up each single piece of mail, moves it in view of the camera for the user to browse it remotely, and to decide whether to drop or place it into a "keep" or "discard" compartment. One advantage of using the intelligent mailbox is that people do not need to be physically present at home to sort their mail. Users can monitor, sort and discard mail remotely, using electronic devices such as desktop computers, tablets, smart phones, wearable device, etc.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 1:
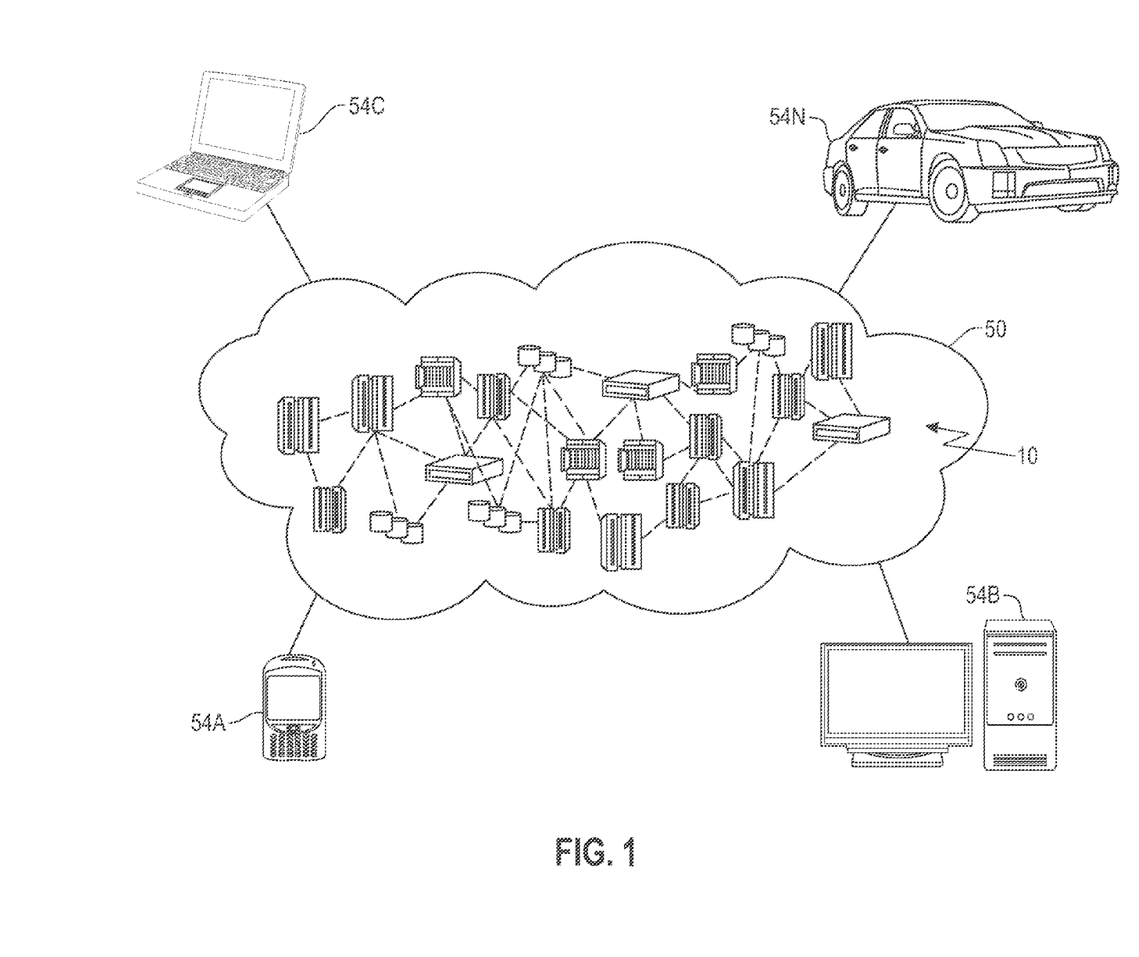
FIG. 1 depicts a cloud computing environment, according to an embodiment.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
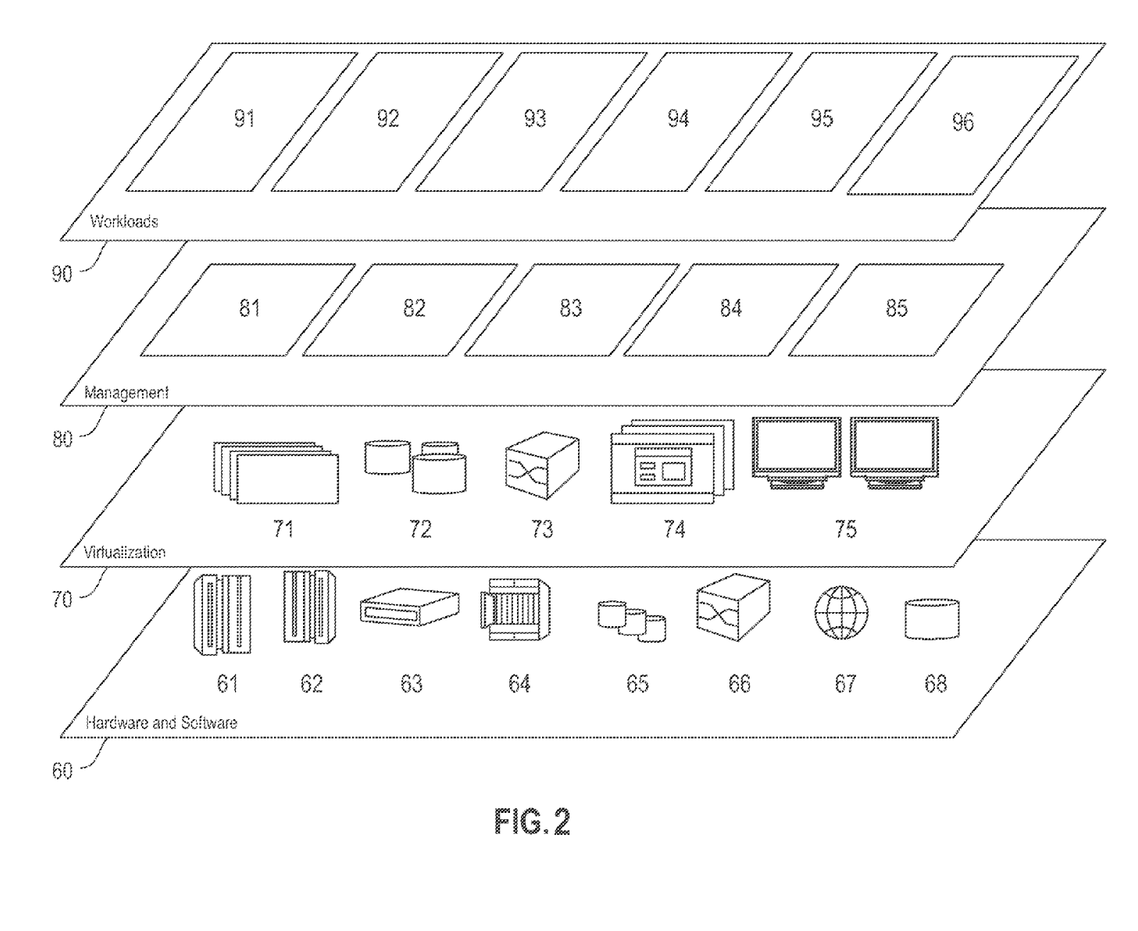
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and controlling of a smart mailbox 96. As mentioned above, all of the foregoing examples described with respect to FIG. 2 are illustrative only, and the invention is not limited to these examples.

It is understood all functions of one or more embodiments as described herein may be typically performed in the computing environment 50 (FIG. 1), the network 300 (FIG. 3) for the electronic smart mailbox 400 (FIG. 4), and control interface 500 (FIG. 5), which can be tangibly embodied as hardware processors and with modules of program code. However, this need not be the case. Rather, the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
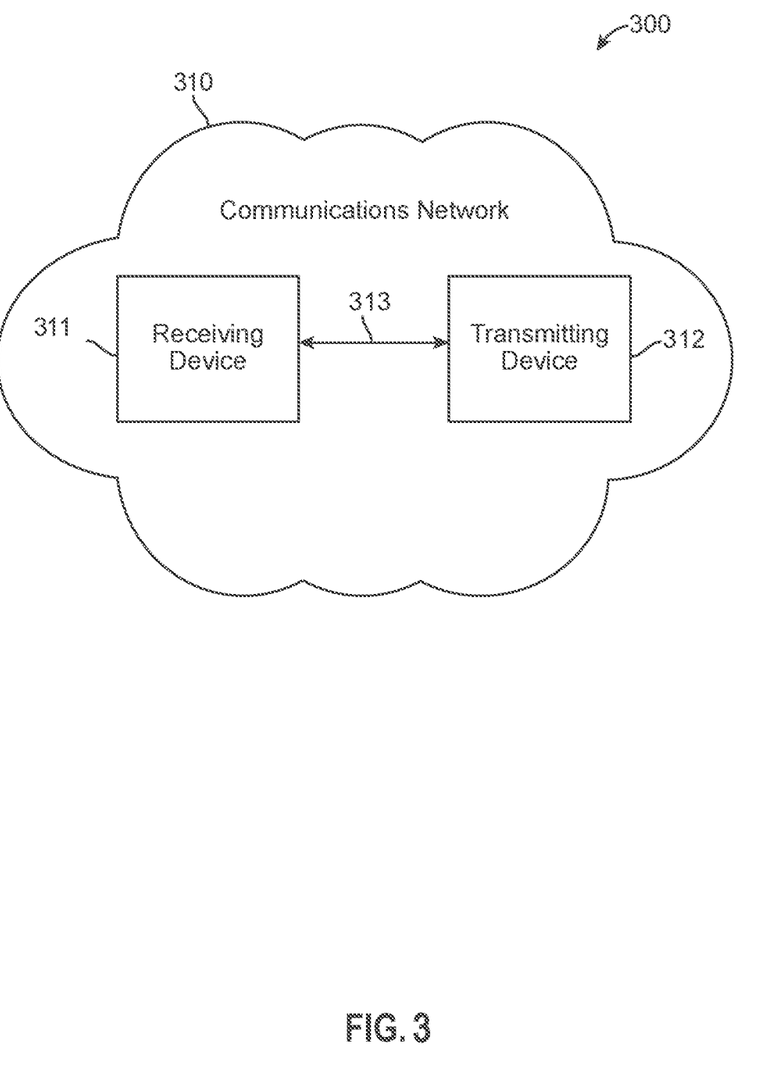
FIG. 3 shows a schematic view of a communications system, according to an embodiment.

FIG. 3 is a schematic view of a communications network 310, in accordance with one embodiment. Communications network 310 may include a communications device that initiates an outgoing communications operation (transmitting device 312) and a communications network 310, which transmitting device 312 may use to initiate and conduct communications operations with other communications devices within communications network 310. For example, communications network 310 may include a communication device (receiving device 311) that receives the communications operation from the transmitting device 312. Although communications network 310 may include multiple transmitting devices 312 and receiving devices 311, only one of each is shown in FIG. 3 to simplify the drawing.

Any suitable circuitry, device, system or combination of these (e.g., a wireless communications infrastructure including communications towers and telecommunications servers) operative to create a communications network may be used to create communications network 310. Communications network 310 may be capable of providing communications using any suitable communications protocol. In some embodiments, communications network 310 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 310 may support protocols used by wireless and cellular phones and personal email devices. Such protocols may include, for example, GSM, GSM plus EDGE, CDMA, quadband, and other cellular protocols. In another example, a long range communications protocol can include Wi-Fi and protocols for placing or receiving calls using VOW, LAN, WAN, or other TCP-IP based communication protocols. The transmitting device 12 and receiving device 11, when located within communications network 310, may communicate over a bidirectional communication path such as path 313, or over two unidirectional communication paths. Both the transmitting device 312 and receiving device 311 may be capable of initiating a communications operation and receiving an initiated communications operation.

The transmitting device 312 and receiving device 311 may include any suitable device for sending and receiving communications operations. For example, the transmitting device 312 and receiving device 311 may include mobile telephone devices, television systems, tablets, wearable devices, other smart devices, and any other device capable of communicating wirelessly (with or without the aid of a wireless-enabling accessory system) or via wired pathways (e.g., using traditional telephone wires). The communications operations may include any suitable form of communications, including for example, data communications (e.g., e-mails, text messages, media messages), video communication or combinations of these.

Figure 4:
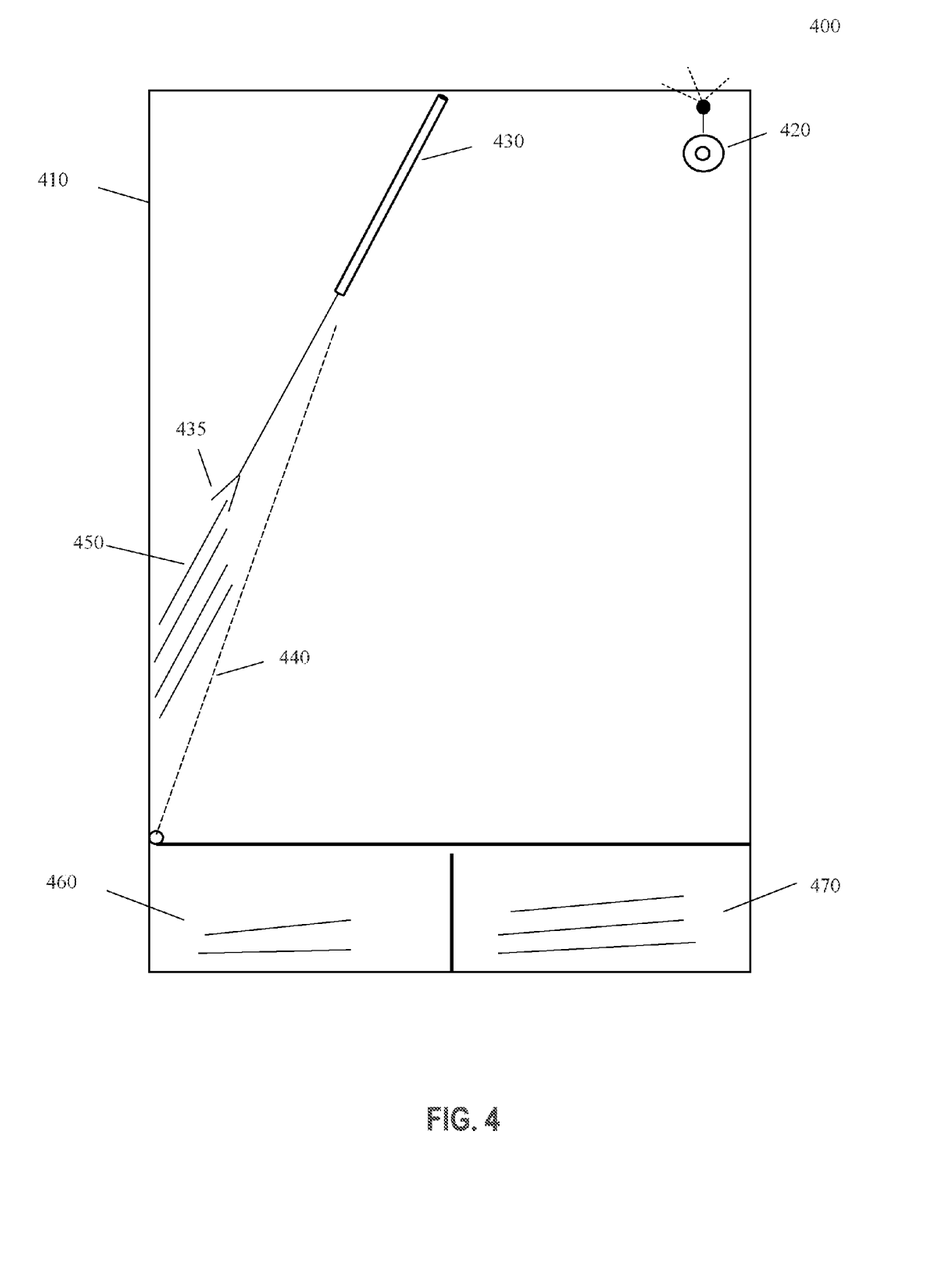
FIG. 4 shows a block diagram of architecture for an intelligent mailbox, according to an embodiment.

FIG. 4 shows a block diagram of architecture for an intelligent mailbox 400, according to an embodiment. In one embodiment, the intelligent mailbox 400 includes a mail receptacle platform 440 that receives and stacks mail 450 (e.g., envelopes, letters, postcards, etc.), and rotates (e.g., using an actuator, motor, etc.) to uncover mail either horizontally or at an angle, a retained mail compartment 460, a discarded mail compartment 470, a video camera 420 that captures video (or photographs) within a general mail receptacle 410, an extendible arm 430 including a mail grabber 435 and a control interface 520 (FIG. 5) that receives control signals and transmits video/photos captured by the video camera 420 wirelessly. In one embodiment, the extendible arm is connected to an actuator configured to be actuated based on received control signals by the control interface 520, to place a particular piece of mail for viewing by the video camera, and to sort mail retained by the mail receptacle platform into one of the retained mail compartment and the discarded mail compartment.

In one embodiment, the video camera 420 comprises one or more camera devices that include functionality for capturing still and video images, communication interoperability for sending, sharing, etc., photos/videos, etc. In one embodiment, communications circuitry connected to the video camera 420 may be any suitable communications circuitry operative to connect to a communications network (e.g., communications network 310, FIG. 3) and to transmit communications operations and media from the video camera 420 to other devices within the communications network. The communications circuitry may be operative to interface with the communications network using any suitable communications protocol such as, for example, Wi-Fi (e.g., an IEEE 802.11 protocol), BLUETOOTH®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol. In some embodiments, the communications circuitry may be operative to create a communications network using any suitable communications protocol. For example, the communications circuitry may create a short-range communications network using a short-range communications protocol to connect to other communications devices. For example, the communications circuitry may be operative to create a local communications network using the BLUETOOTH® protocol to couple the video camera 420 with a BLUETOOTH® device.

In one embodiment, a user may activate the mail receptacle platform 440, extendible arm 430 and the mail grabber 435 using the control interface 520 (FIG. 5) using any computing device that is capable of transmitting and receiving signals, including video/photos captured by the video camera 420. In one embodiment, an app on a smart phone may be employed to activate the intelligent mailbox 400, which includes turning on or connecting a power source (e.g., batteries or a direct line power source (e.g., 110V using a AC/DC converter, etc.). The power source then powers the video camera and the actuator 510 (FIG. 5) to rotate the mail receptacle platform 440, move and extend the extendible arm 430, control the grabber 435 to position mail 450 in front of the video camera 420. The image(s) or video of the mail 450 is then transmitted using the transmitter 522 to the user's communication device (e.g., a smart phone, tablet, computer, etc.). The user then may determine whether the mail 450 should be retained or discarded. If the user determines to discard the mail 450, a selection is received by the app and then transmitted to the receiver 521. The control interface 520 then controls the actuator 510 to move the extendible arm 430 and grabber 435 to place the mail 450 to the discarded mail compartment 470, which is a separate compartment from the retained mail compartment 460. If the user determines to retain the mail, a similar process is completed and the signals received by the receiver 521 are used by the control interface 520 to control the actuator 510 to move the extendible arm 430 and grabber 435 to place the mail 450 in the retained mail compartment 460. When the user arrives at the intelligent mailbox 400, the mail is already sorted between mail to discard and mail to retain.

Figure 5:
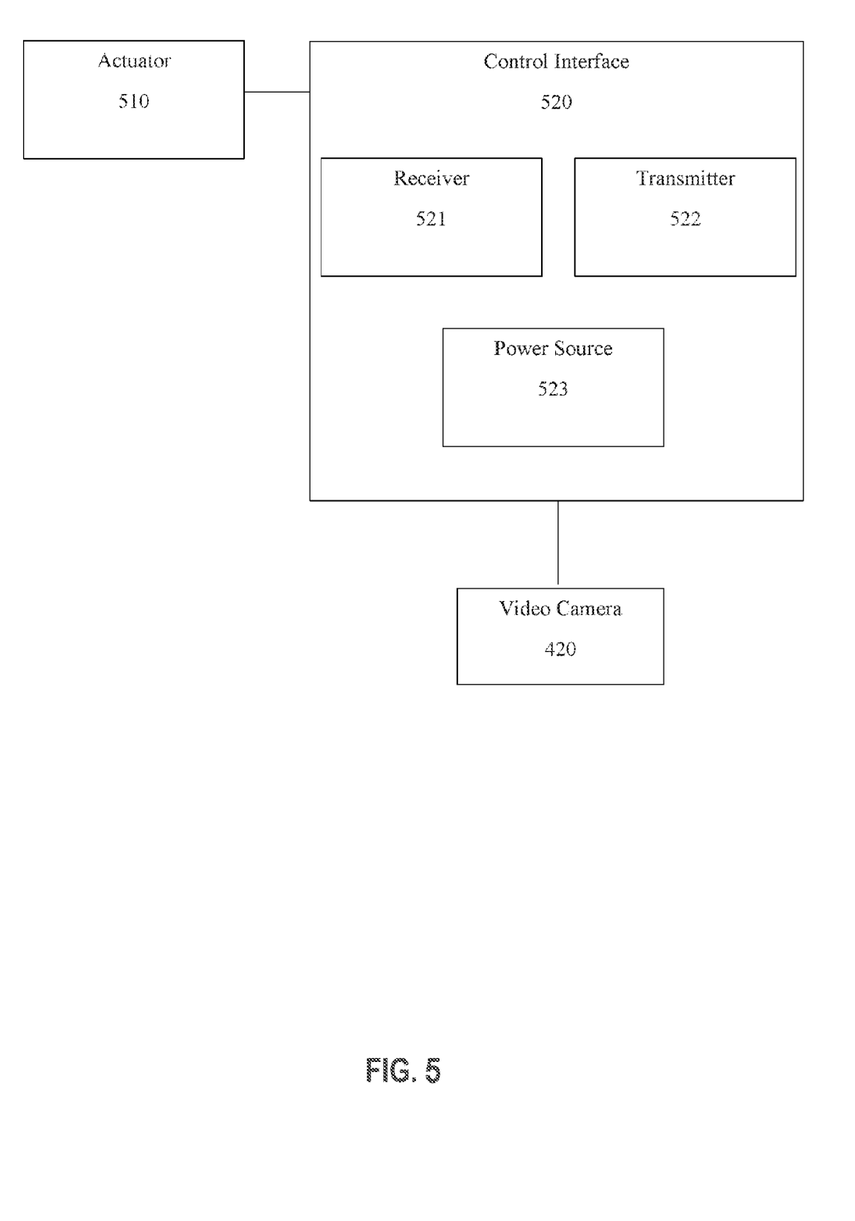
FIG. 5 shows a block diagram a control interface, according to an embodiment.

FIG. 5 shows a block diagram a control interface 520, according to an embodiment. In one example, the control interface is connected with the video camera 420 (FIG. 4). The control interface 520 includes a receiver 521 configured to receive wireless control signals for controlling rotation of the mail receptacle platform 440 and movement and extension of the extendible arm 430 (FIG. 4) and the grabber 435, a transmitter 522 that is configured to transmit video signals captured from the video camera 420, and a power source 523 (e.g., one or more batteries, electric connection, etc.) configured to be turned on and off based on at least one of a received power control signal and sensed motion from the video camera 420 (or a separate motion detector/sensor that detects when mail is placed into the general mail receptacle 410). The power source 523 is configured to supply power to the actuator 510 and the video camera 420 upon activation from the control signal. In one example, the actuator 510 may include one or more motors, gears, linkages, etc. in order to move the extendible arm 430 and grabber 435. In one example, the extendible arm is telescopic.

In one embodiment, the control interface 520 may include control circuitry that may be operative to control the operations and performance of the intelligent mailbox 400 (FIG. 4). The control circuitry may include, for example, one or more processors, a bus (e.g., for sending instructions to the other components of the intelligent mailbox 440, memory, storage, or any other suitable component for controlling the operations of the intelligent mailbox 400. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the intelligent mailbox 400 performs communications operations.

In one embodiment, the control circuitry of the control interface 520 may be operative to perform the operations of one or more applications implemented on the intelligent mailbox 400 (FIG. 4). Any suitable number or type of applications may be implemented. Although the following discussion will enumerate different applications, it will be understood that some or all of the applications may be combined into one or more applications. For example, the intelligent mailbox 400 may include one or multiple applications operative to perform communications operations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A mailbox comprising:
   a mail receptacle platform configured to receive and to stack mail, and rotate to collect new mail;
   a retained mail compartment;
   a discarded mail compartment;
   a video camera configured to capture video within a general mail receptacle compartment;
   an extendible arm including a mail grabber, the extendible arm is coupled to an actuator configured to be actuated based on control signals, to place a particular piece of mail for viewing by the video camera, and to sort mail retained by the mail receptacle platform into one of the retained mail compartment and the discarded mail compartment; and
   a control interface configured to receive control signals and transmit video captured by the video camera, the control interface comprising:
      a receiver configured to receive wireless control signals for controlling movement and extension of the extendible arm, the grabber and the mail receptacle platform;
      a transmitter configured to transmit video signals captured from the video camera; and
      a power source configured to be turned on and off based on at least one of a received power control signal and sensed motion within the mail receptacle platform,
   wherein the power source is configured to supply power to the actuator and the video camera.

* * * * *